US006281261B1

United States Patent
Bennington

(10) Patent No.: US 6,281,261 B1
(45) Date of Patent: Aug. 28, 2001

(54) FLAME-RETARDANT UV CURABLE SILICONE COMPOSITIONS

(75) Inventor: Lester D. Bennington, East Hartford, CT (US)

(73) Assignee: Loctite Corporation, Rocky Hill, CT (US)

( * ) Notice: Subject to any disclaimer, the term of this patent is extended or adjusted under 35 U.S.C. 154(b) by 32 days.

(21) Appl. No.: 09/700,778

(22) PCT Filed: May 28, 1999

(86) PCT No.: PCT/US99/11837

§ 371 Date: Nov. 20, 2000

§ 102(e) Date: Nov. 20, 2000

(87) PCT Pub. No.: WO99/62960

PCT Pub. Date: Dec. 9, 1999

Related U.S. Application Data

(60) Provisional application No. 60/119,953, filed on Feb. 12, 1999, and provisional application No. 60/087,449, filed on Jun. 1, 1998.

(51) Int. Cl.⁷ .............................. C08F 2/46; C08J 5/34; C08L 83/04; C08G 77/04
(52) U.S. Cl. ............................ 522/99; 522/18; 522/29; 522/77; 522/81; 522/83; 524/860; 524/858; 524/430; 524/91; 524/92; 524/262; 524/398
(58) Field of Search ..................... 522/18, 29, 77, 522/81, 83, 99; 524/860, 858, 430, 91, 92, 262, 398

(56) References Cited

U.S. PATENT DOCUMENTS

| | | |
|---|---|---|
| 4,201,808 | 5/1980 | Culley et al. ..................... 428/40 |
| 4,293,397 | 10/1981 | Sato et al. ..................... 204/159.13 |
| 4,348,454 | 9/1982 | Eckberg ........................... 428/334 |
| 4,355,121 * | 10/1982 | Evans . |
| 4,528,081 | 7/1985 | Lien et al. ..................... 204/159.13 |
| 4,595,471 * | 6/1986 | Preiner et al. . |
| 4,604,424 * | 8/1986 | Cole et al. . |
| 4,675,346 * | 6/1987 | Lin et al. . |
| 4,699,802 | 10/1987 | Nakos et al. ..................... 427/54.1 |
| 4,943,613 * | 7/1990 | Arai et al. . |
| 5,073,583 * | 12/1991 | Broderick . |
| 5,179,134 | 1/1993 | Chu et al. ........................... 522/37 |
| 5,212,211 | 5/1993 | Welch, II et al. .................. 552/32 |
| 5,302,627 | 4/1994 | Field et al. ........................ 522/13 |
| 5,352,731 * | 10/1994 | Nakano et al. . |
| 5,872,170 | 2/1999 | Mine et al. ....................... 524/440 |
| 5,912,287 * | 6/1999 | Matsushita et al. . |

FOREIGN PATENT DOCUMENTS

| | | | |
|---|---|---|---|
| 1144237 | 3/1997 | (CN) . | |
| 808874 | 11/1997 | (EP) | ............. C08L/83/04 |
| 808875 | 11/1997 | (EP) | ............. C08L/83/04 |
| 822231 | 4/1998 | (EP) | ............. C08L/83/04 |
| 1323869 | 7/1973 | (GB) | ............. C08G/47/02 |
| 2066277 | 7/1981 | (GB) | ............. C08L/83/04 |
| 2039287 | 8/1989 | (GB) | ............. C08G/77/04 |

* cited by examiner

*Primary Examiner*—James J. Seidleck
*Assistant Examiner*—Sanza McClendon
(74) *Attorney, Agent, or Firm*—Steven C. Bauman

(57) ABSTRACT

The present invention is directed to silicone formulations which are capable of being rapidly cured to tough elastomeric materials through exposure to UV radiation. The cured products demonstrate high resistance to flammability and combustibility.

16 Claims, No Drawings

FLAME-RETARDANT UV CURABLE SILICONE COMPOSITIONS

This is a continuation of provisional application 60/087,449 filed Jun. 1, 1998 and provisional application No. 60/119,953 filed Feb. 12, 1999.

BACKGROUND OF THE INVENTION

1. Field of the Invention

This application relates to UV curable silicone compositions, which demonstrate high resistance to flammability and combustibility, and to silicone (polyorganosiloxane) rubber materials produced therefrom.

2. Brief Description of Related Technology

Silicone rubber and liquid compositions exist in various forms as characterized by their differing cure chemistry, viscosity, polymer type and purity. They can be formulated into one-part or two-part systems, and a particular silicone composition can be engineered to be curable by more than one mechanism.

Moisture-curing mechanisms, heat-curing mechanisms, and photo-initiated curing mechanisms are among the means used to initiate cure, i.e., cross-linking of reactive silicones. These mechanisms are based on either condensation reactions, whereby moisture hydrolyzes certain groups on the silicone backbone, or addition reactions that can be initiated by a form of energy, such as electromagnetic radiation or heat. In certain silicone compositions, a combination of such cure mechanisms may be used to achieve the desired results.

For example, reactive polyorganosiloxanes can be cured by heat in the presence of a peroxide. Alternatively, these reactive siloxanes can also be cured by heat in the presence of silicone hydride-containing (—SiH) compounds and a metallic hydrosilylation catalyst, such as an organoplatinum catalyst.

UV curing silicones having methacrylate functional groups are known. For instance, U.S. Pat. No. 4,675,346 (Lin) is directed to UV curable silicone compositions including at least 50% of a specific type of silicone resin, at least 10% of a fumed silica filler and a photoinitiator, and cured compositions thereof.

Other known UV curing silicone compositions include those disclosed in Great Britain Patent No. 1,323,869 [composition for plate-making in printing consisting of an organopolysiloxane containing a (meth) acrylate functional group, a photosensitizer, and a solvent, which cures to a hard film]; U.S. Pat. Nos. 4,201,808 (Culley) and 4,348,454 (Eckberg) (compositions of an organopolysiloxane having an average of at least one acryloxy and/or methacryloxy group per molecule; a low molecular weight polyacrylyl crosslinking agent; and a photosensitizer, reported as being suitable for release coatings and curable upon exposure to UV radiation); and Great Britain Patent No. 2,039,287 (composition for protective coatings on paper prepared from the reaction of methacryloxypropyltrimethoxysilane and low molecular weight hydroxyl-terminated polyorganosiloxanes).

In certain commercial applications of such silicone formulations, flammability and combustibility is a concern, particularly where it is an issue in production or with the end user. As a result, ordinarily only a subset of such silicone formulations have been used in such instances.

In the past, to alleviate the concern, heat-curable silicone compositions have been used where moldability of the composition itself and electrical properties of the cured product were desirable. Such heat-curable silicone compositions have been rendered resistant to flammability and combustion through the addition of halogenated materials, fillers, organo-platinum materials, and benzotriazoles.

However, the use of halogenated materials to achieve that property is undesirable because of toxicity and environmental concerns, as well as possibly contaminating the substrate on which the composition is placed.

Other ways of rendering such heat-curable silicone compositions are also known. For instance, European Patent Application Nos. 801 111, 808 874 and 808 875, each relate to liquid silicone rubber compositions which, after cure, are reported as producing a highly flame retardant silicone rubber. The compositions are polyorganosiloxane-based, and contain silica filler, aluminum hydroxide, benzotriazole, and a platinum-3,5-dimethyl-1-hexyn-3-ol reaction mixture. The compositions may further include zinc carbonate, polyorganohydrogensiloxane, and a hydrosilylation reaction catalyst.

In addition, a recently-published Chemical Abstracts citation to a Chinese patent document refers to a flame retardant silicone rubber for dielectric coatings of electric wire containing a vinyl-siloxane rubber, benzotriazole, chloroplatinic, a silica filler, and hydroxy silicone oil. See Chem. Abs. 128:168854s (1998)(citing Chinese Patent Document CN 1,144,237). Vinyl-siloxane rubbers are ordinarily curable by thermal mechanisms.

However, with certain commercial applications, heat-curable silicones present shortcomings. Those shortcomings include their limited usefulness with heat-sensitive substrates and/or heat-sensitive electronic circuitry. In addition, heat-curable silicones generally are slower to cure than silicones curable through other mechanisms, such as uv cure. Such a shortcoming is seen to be troublesome in the fabrication of devices, where the slower cure speed renders the fabrication process otherwise less efficient. Therefore, the applicability of such heat-curable silicones across a wide range of end-use applications appears to be limited.

Indeed, in those applications where a UV curable silicone composition would be desirable, one could not simply use the flame retardant materials as they have been used in the past with heat-curable silicones to impart such properties. That is, certain of these filler materials generally (and in the amounts called for by the EP '111, '874 and '875 publications) would render the compositions less transmissive to light (and oftentimes opaque). Compositions containing such fillers, thus, may not be cured properly by exposure to UV radiation. That is, at best a surface skin may form, but cure through volume likely will not occur due to interference by the filler.

Moreover, in practice, the compositions themselves would exhibit poor flow properties because of the amount of fillers used. And, when cured, the compositions may be brittle and therefore reduce the integrity of bonds formed therefrom.

And, a recently-published Chemical Abstracts citation to a Japanese patent document refers to UV-curable polysiloxane coating compositions reportedly having flame retardant capabilities. These silicone compositions contain a siloxane component, 2-hydroxy-2-methyl-1-phenylpropane and aluminum acetylacetonate. These compositions do not however appear to be filled, and there therefore may not possess the strength required of a cured material in a sealant or conformal coating application.

Accordingly, a need is seen for a UV curable silicone which is also resistant to flammability and combustibility.

Despite the existence of this need, it is not believed to date that UV curable filled silicone compositions have been made flame- and combustion-retardant.

Thus, notwithstanding the state-of-the-silicone technology with respect to flame and combustion retardancy, it would be desirable for a flame-retardant silicone compositions to be curable by exposure to UV radiation.

SUMMARY OF THE INVENTION

The present invention is directed to silicone formulations, which are capable of being rapidly cured to tough elastomeric materials through exposure to UV radiation. The cured products demonstrate high resistance to flammability and combustibility.

More specifically, the compositions of the present invention include:

(a) a silicone resin component comprising a reactive polyorganosiloxane having at least one functional group selected from (meth)acrylate, carboxylate, maleate, cinaminate and combinations thereof;

(b) optionally, an inorganic filler component;

(c) a photoinitiator component; and (d) a flame-retardant component in an amount effective to enhance the resistance of the composition to flammability.

The flame-retardant component may be selected from organometallic or silyl metallic materials, aluminas, precipitated silicas, and combinations thereof.

The inventive compositions may further include a triazole component and/or a reactive diluent component, examples of which are given below.

Also provided are methods of preparing the compositions of the inventions, methods of using such compositions, and reaction products of such compositions.

The present invention will be more readily appreciated by a reading of the section entitled "Detailed Description of the Invention" which follows below.

DETAILED DESCRIPTION OF THE INVENTION

The compositions of the present invention are silicone-based, with the resinous or polymerizable component of the inventive compositions being a silicone material, characterized acrylic groups. These acrylic groups render the silicone material(s) susceptible to UV curing. As used herein, the term "acrylic group" is intended to refer to groups of the structure

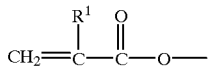

where $R^1$ is H or alkyl. Acrylate, methacrylate and ethacrylate groups are examples of such acrylic groups.

Representative silicones include those found within formula:

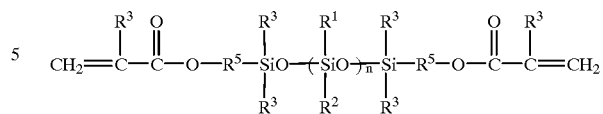

I where $R^1$, $R^2$ and $R^3$ may be the same or different and are organo groups including alkyls, such as methyl, ethyl and the like, halo alkyls such as 3,3,3-trifluoropropyl, substituted or unsubstituted aryls, such as benzyl or phenyl, and others such as vinyl, methacryloxypropyl, mercaptopropyl, hydrogen or benzoin groups; $R^4$ is H or $C_{1-5}$ alkyl; $R^5$ is alkylene, such as $C_{1-8}$ alkylene; and n is at least 80.

Desirably, $R^1$ and $R^2$ are alkyl groups, such as methyl; $R^3$ is methyl; $R^4$ is methyl; and $R^5$ is propylene.

The number of repeat units in the silicone of formula (I) should be at least about 80 in order to obtain the desired gel or elastomeric properties in the cured materials. Although n does not have a theoretical limit, it should not exceed 1500, as more than 1500 repeat units ordinarily yields a polymer which may be difficult to process, apply and cure.

Reactive silicones within formula (1) may be prepared from silanol-terminated silicones within formula (2).

An optional component in the inventive compositions is an inorganic filler component. When present, this component adds structural properties to the cured composition, as well as confers flowability properties to the composition in the uncured state. This component may often be reinforcing silicas, such as fumed silicas, and may be untreated (hydrophilic) or treated so as to render them hydrophobic. Virtually any reinforcing fumed silica may be used.

When present, the fumed silica should be used at a level of up to about 50 weight percent, with a range of about 4 to at least about 10 weight percent, being desirable. While the precise level of silica may vary depending on the characteristics of the particular silica and the desired properties of the composition and the reaction product thereof, care should be exercised by those persons of ordinary skill in the art to allow for an appropriate level of transmissivity of the inventive compositions to permit a UV cure to occur.

Desirable hydrophobic silicas include hexamethyldisilazane-treated silicas, such as those commercially available from Wacker-Chemie, Adrian, Mich. under the trade designation HDK-2000. Others include polydimethylsiloxane-treated silicas, such as those commercially available from Cabot Corporation under the trade designation CAB-O-SIL N70-TS, or Degussa Corporation under the trade designation AEROSIL R202. Still other silicas include trialkoxyalkyl silane-treated silicas, such as the trimethoxyoctyl silane-treated silica commercially available from Degussa under the trade designation AEROSIL R805; and 3-dimethyl dichlorosilane-treated silicas commercially available from Degussa under the trade designation R972, R974 and R976.

The photoinitiator component may be any photoinitiator known in the art to cure acrylic functionalities, including benzoin and substituted benzoins (such as alkyl ester substituted benzoins), benzophenone, Michler's ketone, dialkoxyacetophenones, such as diethoxyacetophenone, benzophenone and substituted benzophenones, acetophenone and substituted acetophenones, and xanthone and substituted xanthones. Desirable photoinitiators include diethoxyacetophenone, benzoin methyl ether, benzoin ethyl ether, benzoin isopropyl ether, diethoxyxanthone, chlorothio-xanthone, azo-bisisobutyronitrile, N-methyl diethanolaminebenzophenone, and mixtures thereof. Visible light initiators include camphoquinone peroxyester initiators and non-fluorene-carboxylic acid peroxyesters.

Particularly desirable photoinitiators include diethoxyacetophenone ("DEAP"). Generally, the amount of photoinitiator should be in the range of about 0.1% to about 10% by weight, such as about 2 to about 6% by weight. The photoinitiator may also be polymer bound. Such photoinitiators are described in U.S. Pat. Nos. 4,477,326 and 4,587,276, the disclosures of each of which are hereby incorporated herein by reference. Other free radical initiators, such as peroxy initiators, may be used.

The flame-retardant component should be used in the composition in an amount effective to enhance the resistance of the composition to flammability and combustion.

Suitable components include complexes of various transition metals with organic ligands or siloxane ligands, provided the complex confers flame-retarding capabilities to the composition in which it is used. Appropriate transition metals include platinum, ruthenium, rhodium, palladium and the like. Virtually any organic ligand or siloxane ligand may be used to complex with the transition metal, provided it aids in retarding flammability and combustibility of the cured silicone-based resin and the resulting complex is compatible from a phase separation perspective with the remaining components in the composition.

Commercially available materials suitable for use as a flame-retardant component include platinum-siloxane complex commercially available from Bayer Corporation under the trade designation BAYSILONE U catalyst Pt/L (CAS 73018-55-0).

Such organometallic or silyl metallic components should be used in an amount within the range of 0.001 to about 1 weight percent, such as about 0.01 to about 0.2 weight percent, to achieve the desired affect.

Other components suitable for such use as the flame-retardant component include hydrated aluminas, precipitated silicas (such as those available commercially under the AEROSIL tradename from DeGussa Corporation), and combinations thereof.

Such other flame-retardant components may be used in an amount up to about 50 weight percent or more, with about 20 to about 50 weight percent being particularly desirable to achieve the desired affect.

Of course, combinations of these flame-retardant components may be used.

A further component which may be included in the compositions of this invention is a triazole component. The triazole component aids the flame- and combustion-retarding properties of the inventive compositions. Suitable triazoles include benzotriazole, and other functionalized benzotriazoles capable of conferring flame-retarding capabilities to the composition in which it is used.

The triazole component may be included in the inventive compositions of a level within the range of about 0.0005 to about 1 weight percent, such as about 0.5 weight percent.

Yet another component that may be included in the inventive compositions is a reactive diluent. When used, the reactive diluent is seen to improve the surface tack of silicone (polyorganosiloxane) rubber materials produced therefrom.

Examples of such reactive diluents include (meth)acrylate-terminated-dimethoxypropyldimethyl siloxane, and other well-known siloxane-based reactive diluents.

When present, the reactive diluent may be used in an amount within the range of about 1 to about 30, such as about 20 weight percent.

The compositions of the invention may also include other ingredients to modify the cured or uncured properties as desired for specific applications. For instance, adhesion promoters, such as (meth)acryloxypropyltrimethoxysilane, trialkyl- or triallyl-isocyanurate, glycidoxypropyl trimethoxysilane and the like, may be incorporated at levels up to about 5 weight percent. Other optional ingredients are non-(meth)acrylic silicone diluents or plasticizers at levels of up to about 30 weight percent. The non-(meth)acrylic silicones include trimethylsilyl-terminated oils of a viscosity in the range of about 100–500 csp, and silicone gums. The non-(meth)acrylic silicones may include cocurable groups such as vinyl groups. However, the presence of such groups may adversely alter the crosslink density and architecture of the cured product.

A desirable method of obtaining (meth)acrylated silicones is reacting a mixture of triethylamine and silanol-terminated silicones, such as polydimethyl siloxane, with dimethylchloro(meth)acryloxypropylsilane, followed by condensation of the resulting aminosilane, yielding dimethyl (meth)acryloxypropylsilyl-terminated silicones, such as dimethyl(meth)acryloxypropylsilyl-terminated polydimethyl siloxane.

The silicone oils used in the formulations of the invention are trimethylsilyl-terminated polydimethylsiloxanes having a viscosity in the range of about 100–5,000 cps. These oils are employed as plasticizers to control the texture and softness of the cured material, and as diluents to adjust the final viscosity of the composition. For electronic potting compositions in which gel-like materials are desired, the plasticizing silicone oil should be present in the range of about 30–70 weight percent of the composition. Lower amounts of silicone oil produce compositions that yield soft rubbery materials. Amounts of silicone oil in excess of about 70 weight percent produce materials which will flow even after curing.

In electronic applications, ion trapping compounds such as crown ethers and cryptates may be useful for reducing ionic conductivity, examples of which include 18-crown-6, 12-crown -4 and 15-crown-5. See also U.S. Pat. No. 4,271,425, where the use of crown ethers in conventional RTV silicone encapsulants is described.

The physical characteristics of cured reaction products obtained from a given silicone-based composition will depend on the molecular weight of the reactive silicone of formula (I) as well as on the method of cure employed and the amount of oil. In general, a higher molecular weight of the reactive silicone, should yield a softer cured reaction product.

It should be understood that while the photoinitiator is generally used as a separate component, the inventive compositions are intended to include those in which photoinitiating groups are present in the backbone of the same organopolysiloxane polymer which includes the photocurable groups.

This invention also provides a process for preparing a composition, the steps of which include providing and mixing together the components noted above.

Once prepared, the inventive silicone compositions may be used through application to a desired substrate. For instance, the inventive compositions may be applied to a desired substrate by a brush, dip or spray method, or by a pressure-time dispense method, as are well-known in the silicone art. The substrates onto which the compositions may be applied include a variety of materials, such as glass, metal or plastic, particularly when the compositions are to be used in electronic applications.

After the application is complete, exposure to radiation in the UV region of the electromagnetic spectrum should provide the means for curing to occur.

UV radiation sources useful to cure the compositions into cured reaction products include conventional mercury-vapor lamps designed to emit ultraviolet energy in various ultraviolet wavelength bands. For example, useful UV radiation wavelength ranges include 220 to 400 nm.

In electronic applications, it is not uncommon for elevated temperatures to be reached, particularly in localized regions within the device on which the composition has been applied and cured. Such an environment is commonly present during the operation of a crt monitor, such as a television.

Accordingly, the present invention was achieved with particular attention to reducing the flammability or combustibility of the cured reaction product, particularly in the environment in which it is intended to be used.

A standard test for measuring flammability and/or combustibility is known as Underwriters Laboratories UL94, "Test for Flammability of Plastic Materials—UL-94"(Jul. 29, 1997), the disclosure of which is hereby expressly incorporated herein by reference. In this test, the materials are classified as V-0, V-1, or V-2 depending on the flame-retardant performance.

Particularly desirable materials in accordance with this invention should reach a V-0 classification, although certain formulations may be classified at a lower level (such as V-1), depending on the end use for which the material is intended. Details of this test and the performance of cured reaction products within the scope of the invention under test conditions are provided below in the examples.

It can be seen that many compositions within the scope of the present invention, as claimed below, can be formulated to produce a range of cured properties typical of silicone rubbers. These materials find a variety of uses including coating, sealing and potting electronic components in assemblies or devices, which when used in their intended manner are often exposed conditions of elevated temperatures. Under such conditions, products and reaction products of known silicone compositions may ignite or combust, thereby damaging the electronic component, or the assembly or device in which it is used, as well as the surrounding environment and possibly the end user. The present invention addresses such a circumstance.

The following examples are illustrative of the invention.

EXAMPLES

Example 1

An acrylate-terminated polydimethylsiloxane having a weight average molecular weight of about 12,000 was prepared by reacting about 100 grams of a hydroxyl-terminated polydimethylsiloxane (commercially available under the trade designation MASIL SFR 750, from Bayer Chemicals) with about 4.1 grams of dimethylchloromethacryloxypropylsilane along with triethylamine at a temperature of about 70° C. to about 100° C. for a time period of about 4 to about 6 hours. After this time period, the reaction mixture was filtered to remove triethylamine hydrochloride and transferred to a container for storage.

The acrylate-terminated polydimethylsiloxane reaction product (92.69 weight percent) prepared above was mixed with an inorganic filler component (5.3 weight percent of a hydrophobic fumed silica, commercially available from Wacker Chemie, Adrian, Mich. under the trade designation HDK-2000), the photoinitiator (1.5 weight percent of DEAP, commercially available from First Chemical), the organo-metallic flame retardant component (0.004 weight percent of the platinum-siloxane complex, BAYSILONE U Catalyst), and the triazole component (0.5 weight percent of benzotriazole, commercially available from Aldrich Chemical Co.).

Example 2

The acrylate-terminated polydimethylsiloxane prepared as above was used in an amount of 50.46 weight percent, and to which was admixed an inorganic filler component (4.22 weight percent of a hydrophobic fumed silica, commercially available from Wacker Chemie, Adrian, Mich. under the trade designation HDK-2000), the photoinitiator (0.25 weight percent of DEAP, commercially available from First Chemical), the flame-retardant component (0.64 weight percent of the platinum-siloxane complex, BAYSILONE U Catalyst, and 23.93 weight percent of hydrated alumina), a reactive diluent component (20 weight percent of a methacrylate-terminated-dimethoxypropyldimethyl siloxane), and an adhesion promoter component [0.5 weight percent of an epoxy silane (glycidoxypropyl trimethoxysilane), commercially available from Sivento].

Example 3

The composition prepared in Examples 1 and 2 were cured by exposure to UV radiation for 18 seconds at an intensity of approximately 70 milliwatts per $cm^2$, after which time rubbery solids were observed to form.

These materials were subjected to a durometer test to measure its hardness and determined to have a 30 Shore A value and 74 Shore 00 value, respectively.

The composition of Example 2 had a UV depth of cure of 3.5 mm and its surface tackiness was less than the cured composition of Example 1.

Example 4

According to the UL-94 test method, the compositions prepared in accordance with Examples 1 and 2 were dispensed into molds and cured as in Example 3 into test pieces of the following dimensions: 125±5mm by 13±5mm.

Five test pieces are arranged such that the middle of a flame may contact the middle portion of the test piece. The flame is maintained in such position relative to the test piece for a period of 10±0.5 seconds. The amount of time the test piece continues to flame after removal of the flame is termed the afterflame time.

Once the test piece stops afterflaming, the flame is positioned toward the same portion of the test piece for an additional period of time of 10±0.5 seconds. After this time period, the flame is removed and this second afterflame time is measured. The afterglow time is also measured thereafter.

After each flame application, five results are measured for the test pieces: (1) the first afterflame time; (2) the second afterflame time; (3) the afterglow time after the second afterflamming; (4) whether the test pieces burn to the clamps; and (5) whether the test pieces drip flaming particles.

From these results, criteria conditions may be measured to determine whether the sample meets a V-0 designation. The criteria conditions are set forth below:

| Criteria Conditions | V-0 | V-1 | V-2 |
|---|---|---|---|
| Afterflame time (first or second) | ≦10 secs | ≦30 secs | ≦30 secs |
| Total afterflame time for any condition set | ≦50 secs | ≦250 secs | ≦250 secs |
| Afterflame plus afterglow time for each individual specimen after the second flame application | ≦30 secs | ≦60 secs | ≦60 secs |
| Afterflame or afterglow of any specimen up to the holding clamp | No | No | No |
| Cotton indicator ignited by flaming particles or drops | No | No | No |

The composition from Example 1 performed well in accordance with these criteria conditions, and established a V-0 rating. Its values were: <6 secs, 8 secs, 0 secs, No, and No. The composition from Example 2 performed well in accordance with these criteria conditions, and established a V-2 rating. Its values, taken as an average of five, were: 17 secs and 37 secs. The remaining three measurements were not observed.

The compositions of this invention may be used in the assembly and manufacture of consumer electronic devices to overcoat electrical connections.

It will be clear to those of skill in the art that variations of the invention as described exist, and such variations are within from the spirit and scope of the invention. Accordingly all such variations are intended to be included within the scope of the claims.

What is claimed is:

1. A flame-resistant silicone composition curable by UV irradiation to an elastomer comprising:
   (a) a reactive silicone resin component comprising a reactive polyorganosiloxane having at least one carboxylate-containing functional group
   (b) optionally, an inorganic filler component;
   (c) a photoinitiator component; and
   (d) a flame-retardant component in an amount effective to enhance the resistance of said composition to flammability, wherein the flame-retardant component is the combination of hydrated alumina and a member selected from the group consisting of organo ligand complexes of transition metals, organosiloxane ligand complexes of transition metals, and combinations thereof.

2. The composition according to claim 1, further comprising a triazole component.

3. The composition according to claim 1, further comprising a reactive diluent component.

4. The composition according to claim 1, wherein the reactive silicone resin is within the formula:

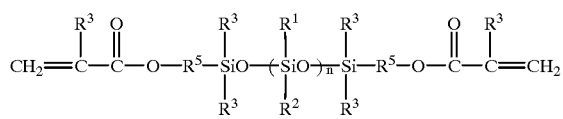

wherein $R^1$, $R^2$ and $R^3$ may be the same or different and are organo groups selected from the group consisting of alkyl, halo alkyls, substituted or unsubstituted aryl, vinyl, methacryloxypropyl, mercaptopropyl, hydrogen and benzoin; $R^4$ is H or $C_{1-5}$ alkyl; $R^5$ is $C_{1-8}$ alkylene; and n is at least 80.

5. The composition according to claim 1, wherein the inorganic filler component is a fumed hydrophobic silica filler.

6. The composition according to claim 5, wherein the fumed silica filler is a member selected from the group consisting of dimethyldichlorosilane-treated silica, hexamethyldisilazane-treated silica, and combinations thereof.

7. The composition according to claim 5, wherein the fumed silica filler is present at a level in range of about 4 to about 10 weight percent.

8. The composition according to claim 1, wherein the flame-retardant component is an organometallic one selected from the group consisting of organo ligand complexes of transition metals, organosiloxane ligand complexes of transition metals, and combinations thereof.

9. The composition according to claim 1, wherein the transition metals are selected from the group consisting of platinum, ruthenium, rhodium, and palladium. ligand complexes of transition metals, and combinations thereof.

10. The composition according to claim 2, wherein the triazole component is a member selected from the group consisting of benzotriazole and derivatives thereof.

11. The composition according to claim 3, wherein the reactive diluent is (meth)acrylate-terminated-dimethoxypropyldimethyl siloxane.

12. Reaction products of the composition according to claim 1.

13. A process for preparing a composition in accordance with claim 1, the steps of which comprise:

providing and mixing together (a) a reactive silicone resin component comprising a reactive polyorganosiloxane having at least one carboxylate-containing functional group; (b) an inorganic filler component; (c) a photoinitiator component; and (d) a flame-retardant component in an amount effective to enhance the resistance of said composition to flammability.

14. A process for curing a composition in accordance with claim 1, the steps of which comprise:

exposing the composition to radiation in the UV region of the electromagnetic spectrum for a time sufficient to effect cure.

15. The composition according to claim 1, wherein the carboxylate containing functional group is a member selected from the group consisting of (meth)acrylate, maleate, cinnamate and combinations thereof.

16. The composition according to claim 14, wherein the carboxylate-containing functional group selected from the group consisting of (meth)acrylate, maleate, cinnamate and combinations thereof.

* * * * *

UNITED STATES PATENT AND TRADEMARK OFFICE
CERTIFICATE OF CORRECTION

PATENT NO. : 6,281,261 B1  
DATED : August 28, 2001  
INVENTOR(S) : Lester D. Bennington Page 1 of 1

It is certified that error appears in the above-identified patent and that said Letters Patent is hereby corrected as shown below:

Column 2,
Line 11, after "positions" insert -- flame retardant --

Columm 3,
Line 7, change "compositions" to -- composition --

Column 5,
Lines 35 and 44, change "affect" to -- effect --

Column 6,
Line 40, change "12-crown -4" to -- 12-crown-4 --

Column 9,
Line 28, delete "from"

Column 10,
Lines 26-27, delete "ligand complexes of transition metals, and combinations thereof"

Signed and Sealed this

Twenty-second Day of October, 2002

*Attest:*

*Attesting Officer*

JAMES E. ROGAN
*Director of the United States Patent and Trademark Office*